(12) United States Patent
Stanjek et al.

(10) Patent No.: US 7,674,840 B2
(45) Date of Patent: *Mar. 9, 2010

(54) ISOCYANATE-FREE EXPANDABLE MIXTURES EXHIBITING A FAST HARDENING RATE

(75) Inventors: Volker Stanjek, München (DE); Wolfram Schindler, Tüssling (DE); Bernd Pachaly, Mehring/Öd (DE); Andreas Bauer, Kirchdorf am Inn (DE)

(73) Assignee: Wacker Chemie AG, Munich (DE)

( * ) Notice: Subject to any disclaimer, the term of this patent is extended or adjusted under 35 U.S.C. 154(b) by 1243 days.

This patent is subject to a terminal disclaimer.

(21) Appl. No.: 10/468,633

(22) PCT Filed: Jan. 24, 2002

(86) PCT No.: PCT/EP02/00727

§ 371 (c)(1),
(2), (4) Date: Aug. 20, 2003

(87) PCT Pub. No.: WO02/066532

PCT Pub. Date: Aug. 29, 2002

(65) Prior Publication Data

US 2004/0072921 A1   Apr. 15, 2004

(30) Foreign Application Priority Data

Feb. 20, 2001 (DE) .............................. 101 08 038
Feb. 20, 2001 (DE) .............................. 101 08 039
Jul. 27, 2001 (DE) .............................. 101 36 723
Aug. 16, 2001 (DE) .............................. 101 40 132

(51) Int. Cl.
*C08G 77/22* (2006.01)

(52) U.S. Cl. ............. 521/154; 106/287.11; 106/287.13; 106/287.16; 521/130; 521/131; 521/182; 521/183; 528/25; 528/28; 528/29

(58) Field of Classification Search .................. 521/155, 521/170, 159, 130, 131, 154, 182, 183; 106/287.11, 106/287.13, 287.16; 528/25, 28, 29

See application file for complete search history.

(56) References Cited

U.S. PATENT DOCUMENTS 3,494,951 A    2/1970   Berger et al.
4,328,843 A *  5/1982   Fujii ............................ 141/1
5,489,622 A *  2/1996   Hara et al. .................... 522/99
6,020,389 A    2/2000   Hoheneder
6,432,335 B1 * 8/2002   Ladang et al. ................ 264/50
6,790,903 B1 * 9/2004   Majolo et al. ............... 524/506

FOREIGN PATENT DOCUMENTS

DE       4 303 848        8/1994
WO       WO 00/04069      1/2000
WO       WO 00/35981   *  6/2000

OTHER PUBLICATIONS

Derwent Abstract corresponding to WO 00/04069 [AN 2000-225102].
Derwent Abstract corresponding to DE 4 303 848 [AN 1994-250202].

* cited by examiner

*Primary Examiner*—John Cooney
(74) *Attorney, Agent, or Firm*—Brooks Kushman P.C.

(57) ABSTRACT

Isocyanate-free foamable mixtures suitable for filling construction voids and for other uses, comprise isocyanate-free, alkoxysilane-terminated prepolymers (A) which have a silane end group of the formula [1],

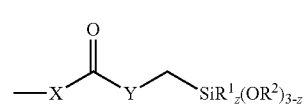

where
X and Y are each an oxygen atom, an N—$R^3$ group or a sulfur atom,
$R^1$ is an alkyl, cycloalkyl, alkenyl or aryl radical having 1-10 carbon atoms,
$R^2$ is an alkyl radical having 1-2 carbon atoms or an ω-oxyalkylalkyl radical having a total of 2-10 carbon atoms,
$R^3$ is a hydrogen atom, an alkyl, alkenyl or aryl radical having 1-10 carbon atoms or a —$CH_2$—$SiR^1_z(OR^2)_{3-z}$ group, and
z is 0 or 1,
with the proviso that at least one of the two groups X and Y is an NH function, and
(B) blowing agents.

24 Claims, No Drawings

US 7,674,840 B2

ISOCYANATE-FREE EXPANDABLE MIXTURES EXHIBITING A FAST HARDENING RATE

BACKGROUND OF THE INVENTION

1. Field of the Invention

The invention relates to isocyanate-free foamable mixtures.

2. Description of the Related Art

Sprayable in-situ foams are used for filling hollow spaces especially in the building sector. Here, they are used, inter alia, for sealing joints, e.g. around windows and doors, and they act as excellent insulating materials and lead to good thermal insulation. Further applications are, for example, insulation of pipes or foaming of hollow spaces in various apparatuses and appliances.

All conventional in-situ foams are polyurethane foams (PU foams) which in the uncrosslinked state comprise prepolymers which have a high concentration of free isocyanate groups. These isocyanate groups are able to undergo addition reactions with suitable reactants even at room temperature, resulting in curing of the spray foam after application. The foam structure is generated by a volatile blowing agent being mixed into the still uncrosslinked raw material and/or by means of carbon dioxide formed by reaction of isocyanates with water. The foam is usually supplied from pressure cans and ejected under the intrinsic pressure of the blowing agent.

Compounds which are reacted with the isocyanates are alcohols having two or more OH groups, especially branched and unbranched polyols, or else water. The latter reacts with isocyanates to liberate carbon dioxide, as mentioned above, and form primary amines which can then add directly onto a further, not yet reacted isocyanate group. These reactions form urethane and urea units which, owing to their high polarity and their ability to form hydrogen bonds in the cured material, can form partially crystalline substructures and thus lead to foams having a high hardness, compressive strength and ultimate tensile strength.

Blowing agents used are usually gases which are condensable at a relatively low pressure and can thus be mixed in the liquid state into the prepolymer mixture without the spray cans having to be subjected to excessively high pressures. The prepolymer formulations further comprise additional additives such as foam stabilizers, emulsifiers, flame retardants, plasticizers and catalysts. The latter are usually organic tin (IV) compounds or tertiary amines. However, iron(III) complexes, for example, are also suitable here.

PU spray foams are produced both as one-component (1K) foams and two-component (2K) foams. The 1K foams cure exclusively by contact of the isocyanate-containing prepolymer mixture with atmospheric moisture. The carbon dioxide liberated during the curing reaction of the 1K foams can additionally aid foam formation. 2K foams consist of an isocyanate component and a polyol component which have to be intimately mixed with one another immediately before foaming and cure as a result of the reaction of the polyol with the isocyanates. An advantage of the 2K systems is an extremely short curing time of sometimes only a few minutes for complete curing to occur. However, they have the disadvantages that they require a more complicated pressure can with two chambers and are also significantly less comfortable to handle than the 1K systems.

The cured PU foams have, in particular, excellent mechanical and thermal insulation properties. Furthermore, they display very good adhesion to most substrates and have virtually unlimited stability under dry conditions in the absence of UV radiation. Further advantages are the nontoxic nature of the cured foams after all isocyanate units have quantitatively reacted, and their rapid curing and ease of handling. Owing to these properties, PU foams have been found to be very useful in industry.

However, PU spray foams have the critical disadvantage that the isocyanate groups can, owing to their high reactivity, also display extreme irritant and toxic properties. In addition, the amines which can be formed by reaction of monomeric diisocyanates with an excess of water are in many cases suspected of being carcinogenic. Such monomeric diisocyanates are present in addition to the isocyanate-terminated prepolymers in most spray foam formulations. For this reason, the uncrosslinked spray foam compositions are not without toxicological concerns before they are fully cured. Critical aspects here are direct contact of the prepolymer mixture with the skin and, in particular, a possible aerosol formation during application of the foam or vaporization of low molecular weight constituents, e.g. monomeric isocyanates. As a result, there is a risk of toxicologically unacceptable compounds being inhaled. In addition, isocyanates have a considerable allergenic potential and can, for example, trigger asthma attacks. These risks are increased by the fact that the PU spray foams are often used not by trained and practised users but by hobbyists and home handymen, so that correct handling cannot always be assumed.

As a result of the hazard potential of conventional PU foams and the associated compulsory labelling, the problem of seriously decreasing acceptance of the corresponding products by users has also occurred. In addition, empty or partly empty spray cans are classified as hazardous waste and have to be appropriately labelled and in some countries, e.g. Germany, even have to be made available for reuse by means of a costly recycling system.

To overcome these disadvantages, prepolymers for spray foams which contain only low concentrations, if any, of monomeric isocyanates have been described, for example in DE-A-43 03 848. However, such systems have the disadvantage that the prepolymers still have isocyanate groups, so that although such PU spray foams are better than conventional foams from a toxicological point of view, they are not unproblematical. Moreover, the acceptance and waste problems are not solved by such foam systems.

It would therefore be desired to have prepolymers which do not crosslink via isocyanate groups and are thus toxicologically acceptable available for the production of spray foams. These prepolymer mixtures should also make it possible to produce spray foams which in the cured state have similarly good properties, especially a comparable hardness, as conventional isocyanate-containing PU foams. In addition, one-component spray foam systems which cure exclusively by contact with atmospheric moisture have to be possible. They should at the same time display comparably trouble-free handling and processability including a high curing rate even at a low catalyst concentration. The latter is important especially because the organotin compounds generally used as catalysts are likewise associated with toxicological concerns. In addition, tin catalysts often also contain traces of highly toxic tributyltin derivatives. A prepolymer system which has such favorable curing properties that a tin catalyst can be entirely omitted would therefore be particularly advantageous.

Condensation-crosslinking silicone foams containing alkoxy-, acyloxy- or oximo-terminated silicone prepolymers have been described in the literature, e.g. in U.S. Pat. No. 6,020,389. Although such foamable mixtures are in principle suitable for producing 1K foams which at room temperature cure entirely as a result of the action of atmospheric moisture, such systems comprising purely silicone-containing prepolymers can only be used for producing elastic flexible to semi-rigid foams. They are not suitable for producing rigid, non-brittle in-situ foams.

WO 00/04069 describes prepolymer formulations comprising alkoxysilane-terminated polyurethane prepolymers for producing rigid spray foams. These are polymers having a conventional polyurethane backbone which can be formed by reaction of customary diisocyanates with polyols. If an appropriate excess of diisocyanates is used in this first reaction step, isocyanate-terminated prepolymers are obtained. These can then be reacted with aminopropyltrimethoxysilane derivatives in a second reaction step to form the desired alkoxysilane-terminated polyurethane prepolymers. These prepolymers can condense with one another in the presence of water and a suitable catalyst with elimination of methanol and cure in this way. The water can be added as such or can come from contact with atmospheric moisture. Thus, both 1K and 2K foams can be produced using such a system.

The alkoxysilane-terminated polyurethane prepolymers described in WO 00/04069 have a spacer having 2-10 carbon atoms between the alkoxysilane chain ends and an adjacent urethane or urea unit. A disadvantage of this system is the only moderate reactivity of these silane-terminated polyurethane prepolymers. Relatively high concentrations of a tin catalyst are therefore required to achieve sufficiently rapid curing.

SUMMARY OF THE INVENTION

It is therefore an object of the present invention to provide isocyanate-free prepolymer formulations which are suitable for producing rapid-curing spray foams. This and other objects are achieved by isocyanate-free foamable mixtures comprising specific isocyanate-free, alkoxysilane-terminated prepolymers of the formula [1]

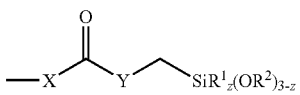

[1]

where
  X and Y are each an oxygen atom, an N—$R^3$ group or a sulfur atom,
  $R^1$ is an alkyl, cycloalkyl, alkenyl or aryl radical having 1-10 carbon atoms,
  $R^2$ is an alkyl radical having 1-2 carbon atoms or an ω-oxaalkylalkyl radical having a total of 2-10 carbon atoms,
  $R^3$ is a hydrogen atom, an alkyl, alkenyl or aryl radical having 1-10 carbon atoms or a —$CH_2$—$SiR^1_z(OR^2)_{3-z}$ group and
  z is 0 or 1, with the proviso that at least one of the two groups X and Y is an NH function, and
  (B) blowing agents.

DETAILED DESCRIPTION OF THE PREFERRED EMBODIMENT(S)

The invention provides isocyanate-free foamable mixtures comprising
  (A) isocyanate-free, alkoxysilane-terminated prepolymers (A) which have a silane end group of the formula [1],

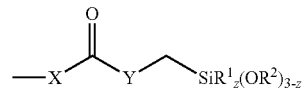

[1]

where
  X and Y are each an oxygen atom, an N—$R^3$ group or a sulfur atom,
  $R^1$ is an alkyl, cycloalkyl, alkenyl or aryl radical having 1-10 carbon atoms,
  $R^2$ is an alkyl radical having 1-2 carbon atoms or an ω-oxaalkylalkyl radical having a total of 2-10 carbon atoms,
  $R^3$ is a hydrogen atom, an alkyl, alkenyl or aryl radical having 1-10 carbon atoms or a —$CH_2$—$SiR^1_z(OR^2)_{3-z}$ group and
  z is 0 or 1, with the proviso that at least one of the two groups X and Y is an NH function, and
  (B) blowing agents.

In the isocyanate-free, foamable mixtures, use is made of alkoxysilyl-terminated prepolymers whose crosslinkable alkoxysilyl groups are separated from a urethane or urea unit only by a methyl spacer. As a result, the mixtures have extremely short tack-free times in the presence of atmospheric moisture and can even be crosslinked tinlessly.

As radicals $R^1$, preference is given to methyl, ethyl or phenyl groups. The radicals $R^2$ are preferably methyl groups, and preferred radicals $R^3$ are hydrogen, alkyl radicals having 1-4 carbon atoms, cyclohexyl and phenyl radicals.

The main chains of the prepolymers (A) can be branched or unbranched. The mean chain lengths can be matched in any appropriate way to the properties desired in each case, for example viscosity of the uncrosslinked mixture and hardness of the finished foam. The main chains can be organopolysiloxanes, e.g. dimethylorganopolysiloxanes, organosiloxane-polyurethane copolymers or organic chains, e.g. polyalkanes, polyethers, polyesters, polycarbonates, polyurethanes, polyureas, vinyl acetate polymers or copolymers. Of course, it is also possible to use any mixtures or combinations of prepolymers having various main chains. The use of organopolysiloxanes or organosiloxane-polyurethane copolymers, if desired in combination with further prepolymers having organic main chains, has the advantage that the resulting foams have a more favorable burning behavior.

Particular preference is given to isocyanate-free foamable mixtures comprising prepolymers (A) which have silane end groups of the formula [2]

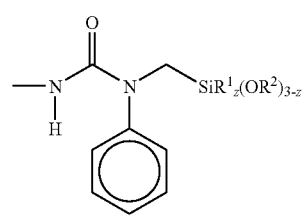

[2]

where $R^1$, $R^2$ and z are as defined above.

Foams produced from foamable mixtures comprising the prepolymers (A) having silane end groups of the formula [2] have a very good structure, both in the case of free foaming and when joints are filled with foam. In addition, end groups of the formula [2] can be produced using starting materials which can be prepared very simply and economically.

The suitable blowing agents (B) are the same gases which can be condensed at relatively low pressures that are also used for producing conventional isocyanate-containing spray foams. Useful blowing agents are, for example, hydrocarbons having in each case 1-5, in particular 3-5, carbon atoms, fluorinated hydrocarbons having 1-5 carbon atoms or dimethyl ether and also mixtures thereof.

Based on 100 parts by weight of prepolymer (A), it is possible, for example, for up to 100 parts by weight, preferably from 1 to 40 parts by weight, of a low molecular weight reactive diluent (C) which has a viscosity of not more than 5 Pas at 20° C. and has at least one $C_1$-$C_6$-alkoxysilyl group per molecule to be present in the mixture.

Suitable reactive diluents (C) are in principle all low molecular weight compounds which have a viscosity of preferably not more than 5 Pas, in particular not more than 2 Pas, at 20° C. and have reactive alkoxysilyl groups via which they can be built into the three-dimensional network being formed during curing of the foam. The reactive diluent (C) serves, in particular, to reduce the viscosity of relatively highly viscous prepolymer mixtures. It can be added during the synthesis of the prepolymers (A) and thus also prevent the occurrence of any highly viscous and thus difficult-to-handle intermediates. The reactive diluent (C) preferably has a sufficiently high (weight-based) density of crosslinkable alkoxysilyl groups for it to be able to be built into the network being formed during curing without reducing the network density.

Preferred reactive diluents (C) are the inexpensive alkyltrimethoxysilanes, e.g. methyltrimethoxysilane, and also vinyltrimethoxysilane or phenyltrimethoxysilane and their partial hydrolysates.

The prepolymers (A) have a sufficiently high reactivity for them to be able to be used to produce foamable 1-component systems which have tack-free times of not more than 5 minutes, in particular not more than 3 minutes, sometimes even less than 1 minute, at 20° C. even at a content of tin catalyst, for example dibutyltin dilaurate, of <0.2% by weight, based on the prepolymer (A). Even tin-free systems are possible without problems when using the prepolymers (A). If, as has been described in the prior art, tin catalyst concentrations of more than 1% by weight, based on the prepolymer (A), are used, the resulting foam is tack-free after only a few seconds after application. The foamable mixtures are preferably free of catalysts containing heavy metals.

Apart from short tack-free times and the use of low catalyst concentrations and/or the use of toxicologically acceptable tin-free catalysts, the high reactivity of the prepolymers (A) results in a further important advantage: the prepolymers (A) react with atmospheric moisture significantly more quickly than the alkyltrimethoxysilanes, vinyltrimethoxysilanes or phenyltrimethoxysilanes used as reactive diluents (C). The conventional prepolymers do not react appreciably more quickly, or even react more slowly, with atmospheric moisture than the abovementioned reactive diluents (C).

In contrast to conventional foamable, silane-terminated prepolymers, these very inexpensive compounds can therefore also be used in relatively large amounts, in particular >1% by weight based on the prepolymer (A), as reactive diluent (C) in the present foamable mixtures without the curing time or the tack-free times being significantly increased.

This is because the condensation of two molecules of the abovementioned reactive diluents (C) or the condensation of one reactive diluent molecule with a prepolymer molecule does not lead to an appreciable increase in chain length and thus does not lead to an increase in the viscosity. No stiffening of the foam and thus no fixing of the foam structure occurs. Nevertheless, considerable amounts of water from the atmosphere are consumed by these condensation reactions and corresponding amounts of methanol are liberated. The presence of the abovementioned reactive diluents in concentrations of about 1% by weight when using conventional prepolymers leads to a significant slowing of foam curing and to significantly longer tack-free times. Higher concentrations of the abovementioned reactive diluents produce a further drastic slowing of foam curing; in some cases, tack-free times of a number of hours are obtained despite tin catalyst concentrations of >1.5% by weight. As a result of this very significant slowing of foam curing, there is also a correspondingly slow fixing of the foam structure, which often leads to at least partial collapse of the foam before it cures. The collapse of the foam structure is also promoted by the liberation of methanol, which is increased in the presence of the reactive diluent (C), in part due to the associated decrease in viscosity.

In contrast, the significantly more reactive prepolymers (A) initially condense mainly with one another even in the presence of one or more of the abovementioned reactive diluents (C). Condensation reactions with participation of the less reactive diluent (C) proceed significantly more slowly. Thus, long-chain polymers or even loose networks are formed right at the beginning of foam curing, resulting in stabilization of the foam structure. A relatively soft but tack-free, cutable foam having a stable structure is therefore formed very quickly. Only when the reaction progresses, i.e. when the initially still soft foam is completely cured, is the reactive diluent (C) also incorporated completely into the evermore close-knit network.

The use of relatively high concentrations of >1-5% by weight, based on prepolymer (A), of one or more of the abovementioned inexpensive reactive diluents (C) which is thus made possible enables the known problems of excessively high viscosities of silane-terminated prepolymers to be solved.

In the preparation of the prepolymers (A), preference is given to using a silane selected from among silanes of the formulae [3] and [4]

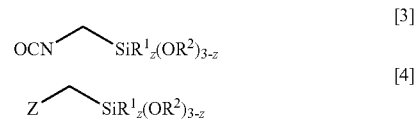

where

Z is an OH, SH or $NHR^3$ group and $R^1$, $R^2$ and z are as defined above.

When a silane of the formula [3] is used, it is preferably reacted with an isocyanate-reactive prepolymer, i.e. an OH—, SH— or $NHR^3$-terminated prepolymer or else with a correspondingly terminated precursor of the prepolymer. The latter is then converted into the finished prepolymer in further reaction steps. When the silane of the formula [4] is used, it is reacted with an NCO-terminated prepolymer or else with an NCO-containing precursor of the prepolymer. The latter is then converted into the finished prepolymer in further reaction steps.

Preference is given to using the silane of the formula [5],

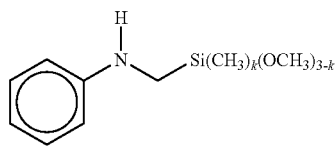

[5]

where
k is 0 or 1,
which can be prepared without problems in only one reaction step by reaction of chloromethyltrimethoxysilane or chloromethyldimethoxymethylsilane with aniline, i.e. from very simple starting materials. Use of this silane gives prepolymers (A) having end groups corresponding to the formula [2].

Apart from the silanes of the formulae [3] to [5], preferred starting materials for preparing the prepolymers (A) are OH-terminated polyols and/or hydroxyalkyl- or aminoalkyl-terminated polysiloxanes and also diisocyanates or polyisocyanates. The concentrations of all isocyanate groups participating in all reaction steps and all isocyanate-reactive groups and also the reaction conditions are selected so that all isocyanate groups react during the course of the prepolymer synthesis. The finished prepolymer (A) is thus free of isocyanate groups. Furthermore, the concentration ratios and the order of the reaction steps are preferably selected so that all chains of the prepolymers (A) are terminated by alkoxysilyl groups corresponding to the formula [1].

The suitable polyols for preparing the prepolymers (A) are, in particular, aromatic and aliphatic polyester polyols and polyether polyols as are widely described in the literature. However, it is in principle possible to use all polymeric, oligomeric or monomeric alcohols having two or more OH functions. As hydroxyalkyl- or aminoalkyl-terminated polysiloxanes, preference is given to using compounds of the formula [6]

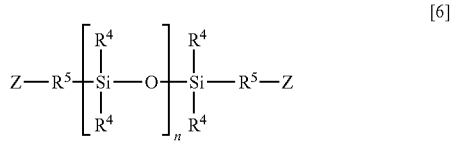

[6]

where
$R^4$ is a hydrocarbon radical having 1 to 12 carbon atoms, preferably a methyl radical,
$R^5$ is a branched or unbranched hydrocarbon chain having 1-12 carbon atoms, preferably a propylene chain, and
n is from 1 to 2000, preferably from 5 to 100, and
Z is as defined above.

Examples of diisocyanates which can be used are diisocyanatodiphenylmethane (MDI), either in the form of crude or technical-grade MDI or in the form of pure 4,4'- or 2,4' isomers or mixtures thereof, tolylene diisocyanate (TDI) in the form of its various regioisomers, diisocyanatonaphthalene (NDI), isophorone diisocyanate (IPDI) or hexamethylene diisocyanate (HDI). Examples of polyisocyanates are polymeric MDI (P-MDI), triphenylmethane triisocyanate or biuret triisocyanates.

If the finished prepolymers (A) have a viscosity which is so high that a reactive diluent (C) has to be used to lower the viscosity, the reactive diluent (C) is preferably added during the synthesis of the prepolymers (A) so as to prevent the formation of highly viscous and thus difficult-to-handle products. If free isocyanate groups are still present in the reaction mixture at any point in time even after addition of the reactive diluent, the reactive diluent (C) must be unreactive toward isocyanates. The reactive diluent (C) is preferably miscible in any proportion with all starting materials and intermediates.

In a particular embodiment, the prepolymer (AO) is prepared by addition of a silane of the formula [3] onto an alcohol (A2) which has at least two OH functions per molecule and is made up of branched or unbranched carbon chains which may be substituted by halogen atoms, $C_1$-$C_6$-alkyl, -alkoxy or -acyloxy radicals and may be interrupted by groups selected from among ether groups, carbonyl groups, ester groups and aromatic and cycloaliphatic units, where the alcohol (A2) contains no urethane or urea units.

It has been found that it is especially the concentration of urethane and/or urea units in the prepolymers and only to a subordinate extent the mean molar mass which is responsible for the viscosity of the alkoxysilane-terminated prepolymers. All known processes in which exclusively polyurethane prepolymers whose core structure has been prepared from polyols and polyisocyanates and therefore has a correspondingly large number of urethane units thus lead essentially to very highly viscous products, even when appropriately short-chain compounds are used as polyol component. On the other hand, the use of short-chain polymers or even monomeric compounds having at least two alkoxysilyl groups is desirable in sprayable in-situ foams. This is because it is possible in this way to achieve a sufficiently high concentration of crosslinkable groups which is necessary to obtain a high network density and the associated high foam hardness during curing. In this respect, the use of the prepolymers (AO) which are obtainable by use of the alcohols (A2) and a silane of the formula [3] represents a significant improvement over the known concepts.

As alcohols (A2), it is possible to use, for example, all branched and unbranched OH-terminated polyether polyols and polyester polyols as are also employed in the production of conventional isocyanate-containing spray foams. There are no restrictions in terms of the chain length and the degree of branching of the alcohols (A2). Particularly useful alcohols are branched or unbranched polyols having mean molar masses (number average Mn) of 200-2000 g/mol, in particular from 500 to 1500 g/mol. However, further OH-terminated polymers, e.g. OH-terminated vinyl acetate polymers or copolymers, are also possible starting materials of this type. Further suitable alcohols are polymers which have free OH functions in the chain, possibly in addition to the terminal OH groups.

Apart from polymeric alcohols, it is also possible to use all monomeric alcohols having at least two OH functions or mixtures of polymeric and monomeric alcohols as alcohols (A2). Examples which may be mentioned are compounds such as ethylene glycol, glycerol, the various propanediol, butanediol, pentanediol and hexanediol isomers, the various pentoses and hexoses and their derivatives and also petaerythrotetraol. Of course, it is also possible to use mixtures of various polymeric and/or monomeric alcohols (A2).

In addition to the prepolymers (A) prepared using alcohols (A2) and a silane corresponding to the formula [3], further alkoxysilane-terminated prepolymers can also be present in the foamable mixtures. These can be alkoxysilane-terminated polyurethane prepolymers (U) which have the core or backbone of a conventional polyurethane prepolymer, i.e. their core has been formed by reaction of a polyisocyanate with a polyol. Such combinations of relatively highly viscous polyurethane prepolymers with the comparatively low-viscosity prepolymers (A) prepared using alcohols (A2) have the advantage that the viscosity of the resulting mixture can be set precisely in accordance with the particular requirements within a wide range and largely independently of the concentration of crosslinkable alkoxysilyl groups by choice of suitable mixing ratios.

In such mixtures, it is in principle possible to use all isocyanate-free alkoxysilane-terminated polyurethane prepolymers as polyurethane prepolymers (U). They can be prepared, for example, by means of the above-described reactions of silanes of the formula [3] or [4] with OH— or NCO-terminated prepolymers which have urethane and/or urea units in their molecular structure.

In a preferred embodiment of the invention, the alkoxysilane-terminated prepolymers (AO) which have no polyurethane core are combined with alkoxysilane-terminated polyurethane prepolymers (U) which can be prepared by reaction of isocyanate-functional alkoxysilanes with OH-functional polyurethane prepolymers. The polyurethane units of the OH-functional polyurethane prepolymers are preferably formed by reaction of a customary polyisocyanate with a polyol. This embodiment has the advantage that the corresponding mixtures of the various alkoxysilane-terminated prepolymers can be produced particularly economically. For example, it is possible firstly to produce a mixture of OH-terminated polyurethane prepolymers and the alcohols (A2) which is then reacted in only one reaction step with an appropriate amount of an isocyanate-functional alkoxysilane of the formula [3].

A particularly preferred method of preparing such a mixture from prepolymers (AO) without a polyurethane core and alkoxysilane-terminated polyurethane prepolymers (U) having a polyurethane core comprises the following process steps:

alcohol (A2) is reacted with a deficiency of a diisocyanate to give a mixture of the unreacted alcohol (A2) and OH-terminated polyurethanes having various chain lengths and urethane group contents. In a second reaction step, this mixture is then reacted with an isocyanate-functional alkoxysilane of the formula [3] to give a mixture of prepolymers (AO) without a polyurethane core and polyurethane prepolymers (U). The ratio of prepolymer (AO) to prepolymer (U), or the viscosity of the resulting prepolymer mixture, can be adjusted via the size of the deficiency of diisocyanate, while the content of alkoxysilyl groups and thus the hardness and brittleness of the finished crosslinked foam can be regulated via the mean molar mass of the alcohols (A2) used. The polyurethane prepolymers (U) prepared in this way have silane end groups of the formula [1] and are therefore, like the prepolymers (AO), also prepolymers (A).

The finished prepolymer mixture, which consists either exclusively of the prepolymers (AO) or of a mixture comprising both prepolymers (AO) and also alkoxysilane-terminated polyurethane prepolymers (U) and/or further alkoxysilane-terminated prepolymers, preferably has a viscosity of <50 Pas at 50° C., particularly preferably a viscosity of <25 Pas at 50° C.

The further prepolymers, in particular the polyurethane prepolymers (U), preferably have silane end groups of the formula [1] and are therefore likewise prepolymers (A).

The reaction between isocyanate groups and isocyanate-reactive groups occurring in the preparation of the prepolymers (A) is preferably accelerated by a catalyst. Preference is given to using the same catalysts as are mentioned below as curing catalysts (D) for the in-situ foam. If desired, the same catalyst or the same combination of a plurality of catalysts which catalyze the prepolymer preparation can also be used as securing catalyst (D) for curing of the foam. In this case, the curing catalyst (D) is already present in the finished prepolymer and does not have to be added in the compounding of the foamable mixture.

To achieve rapid curing of the foam at room temperature, a curing catalyst (D) can be added if desired. As already mentioned, the organic tin compounds customarily used for this purpose, e.g. dibutyltin dilaurate, dioctyl tin dilaurate, dibutyltin diacetylacetonate, dibutyltin diacetate or dibutyltin dioctoate, etc., can be used for this purpose. It is also possible to use titanates, e.g. titanium(IV) isopropoxide, iron(III) compounds, e.g. iron(III) acetylacetonate, or amines, e.g. aminopropyltrimethoxysilane, N-(2-aminoethyl)aminopropyltrimethoxysilane, triethylamine, tributylamine, 1,4-diazabicyclo[2.2.2]octane, N,N-bis(N,N-dimethyl-2-aminoethyl)methylamine, N,N-dimethylcyclohexylamine, N,N-dimethylphenylamine, N-ethylmorpholine, etc. Numerous further organic and inorganic heavy metal compounds and organic and inorganic Lewis acids or bases can also be used here. Furthermore, the crosslinking rate can also be increased further by a combination of various catalysts or of catalysts with various cocatalysts.

The isocyanate-free, foamed mixtures can further comprise the customary additives, for example foam stabilizers and cell regulators, flame retardants, thixotropes and/or plasticizers. As foam stabilizers, it is possible to use, in particular, the commercial silicone oligomers modified by polyether side chains. Suitable flame retardants are, inter alia, the known phosphorus-containing compounds, especially phosphate and phosphonates, halogenated and halogen-free phosphoric esters and also halogenated polyesters and polyols or chloroparaffins.

The isocyanate-free foam mixtures can be used directly as one-component isocyanate-free spray foams. The spray foams are preferably stored in pressure containers, e.g. pressure cans.

The meanings of all symbols in the above formulae are independent of one another. The silicon atom is tetravalent in all formulae.

The following examples illustrate the invention without restricting its scope. Unless indicated otherwise, all amounts and percentages are by weight, all pressures are 0.10 MPa (abs.) and all temperatures are 20° C.

EXAMPLE 1

Preparation of Isocyanatomethyltrimethoxysilane: Methylcarbamatomethyltrimethoxysilane is Synthesized from Chloromethyltrimethoxysilane by Known Methods (U.S. Pat. No. 3,494,951).

This is pumped in a stream of argon into a fused silica pyrolysis tube filled with silica wool. The temperature in the pyrolysis tube is from 420 to 470° C. The crude product is condensed out by means of a condenser at the end of the heated section and collected. The colorless liquid is purified by distillation under reduced pressure. The desired product goes over at the top in a purity of above 99% at about 88-90° C. (82 mbar), while the unreacted carbamate can be reisolated at the bottom. This is returned directly to the pyrolysis.

Starting from 56.9 g (273 mmol) of methylcarbamatomethyltrimethoxysilane, 33.9 g (191 mmol) of the desired product isocyanatomethyltrimethoxysilane are obtained in a purity of >97% in this way. This corresponds to a yield of 70% of theory.

EXAMPLE 2

Preparation of N-phenylaminomethyltrimethoxysilane:

537 g (5.77 mol) of aniline are placed in a laboratory reactor and subsequently made inert by means of nitrogen. It is heated to a temperature of 115° C. and 328 g (1.92 mol) of chloromethyltrimethoxysilane are added dropwise over a period of 1.5 hours and the mixture is stirred at 125-130° C. for a further 30 minutes. After addition of about 150 g of the silane, an increased amount of aniline hydrochloride is precipitated, but the suspension remains readily stirrable to the end of the addition.

Excess aniline (about 180 g.) is removed under a good vacuum (62° C. at 7 mbar). 350 ml of toluene are subsequently added at about 50° C. and the suspension is stirred at 10° C. for 30 minutes so as to crystallise aniline hydrochloride completely. This is subsequently filtered off. The solvent toluene is removed at 60-70° C. in a partial vacuum. The residue is purified by distillation (89-91° C. at 0.16 mbar).

A yield of 331.2 g, i.e. 75.9% of theory, is achieved at a product purity of about 96.5%. The product contains about 3.5% of N,N -bis[trimethoxysilylmethyl]phenylamine as impurity.

EXAMPLE 3

30 g (70.6 mmol) of a polypropylene glycol having a mean molar mass of 425 g/mol are placed in a 250 ml reaction vessel provided with stirring, cooling and heating facilities and dewatered by heating at 100° C. for 1 hour in a diaphragm pump vacuum. The mixture is subsequently cooled to about 50° C. and, at this temperature, 0.10 g of dibutyltin dilaurate and 24.6 g (141.2 mmol) of tolylene 2,4-diisocyanate (TDI) are added under nitrogen at such a rate that the temperature does not exceed 80° C. After the addition is complete, the mixture is stirred at 80° C. for 15 minutes.

The mixture is subsequently cooled to about 50° C. and 5 ml of vinyltrimethoxysilane are added as reactive diluent. 32.1 g (141.2 mmol) of N-phenylaminomethyltrimethoxysilane are subsequently added dropwise and the mixture is then stirred at 80° C. for 60 minutes. No isocyanate groups could be detected by IR spectroscopy in the resulting prepolymer mixture. A clear, transparent prepolymer mixture which has a viscosity of 18.5 Pas at 50° C. and can be poured and processed further without problems is obtained.

EXAMPLE 4

50 g of the prepolymer mixture from Example 3 are mixed with 1.2 g of foam stabilizer PC STAB EP 05 (Wacker Chemie GmbH, Germany) and 1.5 g of AMS 70 (Wacker Chemie GmbH, Germany) as adhesion promoter. This mixture is subsequently placed in a glass pressure vessel fitted with a valve and 12 ml of 1,1,1,2-tetrafluoroethane (R 134) are introduced as blowing agent.

Discharge of this mixture gives a stiff, white foam which becomes tack-free after about 1 minute. The time to complete curing is about 6 hours. The cured foam has a high hardness and a good pore structure, both on free foaming and when foamed in a joint.

EXAMPLE 5

The procedure of Example 4 is repeated, but 0.75 g of dibutyltin dilaurate is additionally added to the foamable mixture. The tack-free time after application of the foam is only a few seconds (<30 sec.). Structure and hardness of the completely cured foam remain unchanged.

EXAMPLE 6

The procedure of Example 3 is repeated, but 0.10 g of iron(III) acetylacetonate is used as catalyst in place of 0.10 g of dibutyltin dilaurate in the prepolymer synthesis. This has no discernible influence on the course of the reaction. A deep red, transparent polymer mixture in which no isocyanate groups can be detected by IR spectroscopy is obtained. It has a viscosity of about 19 Pas at 50° C. and can thus be poured and processed further without problems.

EXAMPLE 7

The procedure of Example 4 is repeated, but only the prepolymer mixture from Example 6 is used. Discharge of the final compounded mixture gives a stiff, orange-yellow foam which becomes tack-free after about 2 minutes. The time to complete curing is about 12 hours. The structure of the completely cured foam remains unchanged, and the hardness is very slightly lower than in Examples 4 and 5.

EXAMPLE 8

The procedure of Example 3 is repeated, but no catalyst at all (no dibutyltin dilaurate) is used in the prepolymer synthesis. Instead, the reaction temperature is increased from 80 to 90° C. in both reaction steps. A clear, transparent prepolymer mixture in which no isocyanate groups can be detected by IR spectroscopy is obtained.

EXAMPLE 9

The procedure of Example 4 is repeated, but only the prepolymer mixture from Example 8 is used. Discharge of the final compounded mixture gives a still, white foam which despite the absence of any metal-containing catalyst becomes tack-free after about 2 minutes. The time to complete curing is about 12 hours. The completely cured foam is no different from the foams from Examples 4 and 5. Foam structure and hardness are unchanged.

EXAMPLE 10

The procedure of Example 3 is repeated, but 29.8 g (141.2 mmol ) of N-phenylaminomethylmethyldimethoxysilane are used as functional silane of the formula 4 in place of 141.2 mmol of N-phenylaminomethyltrimethoxysilane as in Example 3. A clear, transparent prepolymer mixture in which no isocyanate groups can be detected by IR spectroscopy is obtained. It has a viscosity of about 23 Pas at 50° C. and can thus be poured and processed further without problems.

EXAMPLE 11

The procedure of Example 4 is repeated, but only the prepolymer mixture from Example 10 is used. Discharge of the final compounded mixture gives a stiff, white foam which becomes tack-free after about 3 minutes. The time to complete curing is about 6 hours. The fully cured foam is elastic and semirigid. It has a good pore structure, both on free foaming and when foamed in a joint.

EXAMPLE 12

28.6 g (110 mmol) of a polypropylene glycerol having a mean molar mass of 260 g/mol and 8.1 g of a polypropylene glycerol having a mean molar mass of 1500 g/mol are placed in a 250 ml reaction vessel provided with stirring, cooling and heating facilities and dewatered by heating at 100° C. for 1 hour in a diaphragm pump vacuum. The mixture is subsequently cooled to about 50° C. and, at this temperature, 0.10 g of dibutyltin dilaurate and 10.1 g (57.7 mmol) of tolylene 2,4-diisocyanate (TDI) are added under nitrogen. The temperature should not exceed 80° C. during the addition. After the addition is complete, the mixture is stirred at this temperature for a further 15 minutes.

At 50° C. and under a nitrogen atmosphere, 44.3 g (250 mmol) of isocyanatomethyltrimethoxysilane are added to this mixture; the temperature should again remain below 60° C. The mixture is subsequently stirred at 80° C. for 60 minutes. No isocyanate groups can be detected in the resulting prepolymer mixture by IR spectroscopy. A clear, transparent mixture of methoxysilane-terminated prepolymers which has a viscosity of about 17 Pas at 50° C. and can thus be poured and processed further without problems is obtained.

EXAMPLE 13

The procedure of Example 5 is repeated, but only the prepolymer mixture from Example 12 is used. Discharge of the final compounded mixture gives a stiff, white foam which becomes tack-free after only a few seconds (<30 sec). The time to complete curing is about 4 hours. The fully cured foam has a high hardness. On free foaming, it possesses a good pore structure, but occasional cracks and relatively large voids occur when it is foamed in a joint.

COMPARATIVE EXAMPLE 1

The procedure of Example 3 is repeated, but 36.1 g 141.2 mmol) of N-phenyl-3-aminopropylmethyldimethoxysilane (Silquest Y 9669 from Crompton) are used in place of 141.2 mmol of N-phenylaminomethyltrimethoxysilane as in Example 3. A clear, transparent prepolymer mixture in which no isocyanate groups can be detected by IR spectroscopy is obtained. It has a viscosity of about 19 Pas at 50° C. and can thus be poured and processed further without problems.

COMPARATIVE EXAMPLE 2

The procedure of Example 5 is repeated, but only the prepolymer mixture from Comparative Example 1 is used. Discharge of the final compounded mixture gives a stiff, white foam. However, the tack-free time is about 3 hours instead of a few seconds as in Example 5. The time to complete curing is a number of days. The fully cured foam has a high hardness, but, especially when foamed in a joint, possesses a significantly poorer pore structure than the foam from Example 5. Some large bubbles and voids occur.

COMPARATIVE EXAMPLE 3

The procedure of Example 3 is repeated, but 31.3 g (141.2 mmol) of N-ethyl-3-trimethoxysilyl-2-methylpropanamine (A-Link 15 from Crompton) are used in place of 141.2 mmol of N-phenylaminomethyltrimethoxysilane as in Example 3. A clear, transparent prepolymer mixture in which no isocyanate groups can be detected by IR spectroscopy is obtained. It has a viscosity of about 21 Pas at 50° C. and can thus be poured and processed further without problems.

COMPARATIVE EXAMPLE 4

The procedure of Example 5 is repeated, but only the prepolymer mixture from Comparative Example 3 is used. Discharge of the final compounded mixture gives a stiff, white foam. However, the tack-free time is about 60 minutes instead of a few seconds as in Example 5. The time to complete curing is a number of days. The fully cured foam has a high hardness, but, especially when foamed in a joint, possesses a significantly poorer pore structure than the foam from Example 5.

COMPARATIVE EXAMPLE 5

The procedure of Example 12 is repeated, but 51.3 g (250 mmol) of γ-isocyanatopropyltrimethoxysilane (Silquest Y 5187 from Crompton) are used in place of 250 mmol of isocyanatomethyltrimethoxysilane as in Example 12. A clear, transparent prepolymer mixture in which no isocyanate groups can be detected by IR spectroscopy is obtained. It has a viscosity of about 19 Pas at 50° C. and can thus be poured and processed further without problems.

COMPARATIVE EXAMPLE 6

The procedure of Example 13 is repeated, but only the prepolymer mixture from Comparative Example 5 is used. Discharge of the final compounded mixture gives a stiff, white foam. However, the tack-free time is about 20 minutes instead of a few seconds as in Example 13. The time to complete curing is about 2 days. The fully cured foam has a high hardness and on free foaming has a pore structure which is about as good as that of the foam from Example 13. However, a stable foam was not able to be obtained on foaming in the joint. Foaming in the joint gave only a surface layer of foam having a thickness of 5-10 millimeters. The underlying foam had collapsed completely before curing.

The invention claimed is:

1. An isocyanate-free moisture-curable foamable mixture comprising
   (A) one or more isocyanate-free, alkoxysilane-terminated prepolymers (A) which bear at least one silane end group of the formula [1],

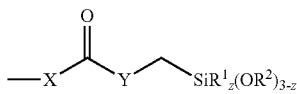

[1]

where
X is O and Y
is NH or where X is NH and Y is NR$^3$,
R$^1$ is an alkyl, alkenyl or aryl radical having 1-10 carbon atoms,
R$^2$ is an alkyl radical having 1-2 carbon atoms or an -oxyalkyl alkyl radical having a total of 2-10 carbon atoms,
R$^3$ is a hydrogen atom, an alkyl, cycloalkyl, alkenyl or aryl radical having 1-10 carbon atoms or a —CH$_2$—SiR$^1_z$(OR$^2$)$_{3-z}$ group and
z is 0 or 1,
with the proviso that at least one of the two groups X and Y is NH, and
(B) at least one blowing agent.

2. The foamable mixture of claim 1, wherein a prepolymer (A) has silane end groups of the formula [2]

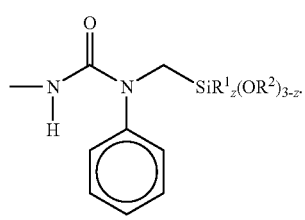
(2)

3. The foamable mixture of claim 1, wherein the blowing agent (B) is selected from the group consisting of hydrocarbons and fluorinated hydrocarbons each having 1-5 carbon atoms, dimethyl ether, and mixtures thereof.

4. The foamable mixture of claim 1, wherein at least one low molecular weight reactive diluent (C) which has a viscosity of not more than 5 Pas at 20° C. and has at least one $C_1$-$C_6$-alkoxysilyl group per molecule is present in the mixture.

5. The foamable mixture of claim 4, wherein at least one reactive diluent (C) is selected from the group consisting of methyltrimethoxysilane, vinyltrimethoxysilane, phenyltrimethoxysilane, and their partial hydrolysis products, and is present in a concentration of >1% by weight, based on the weight of prepolymer(s) (A).

6. The foamable mixture of claim 1, wherein $R^1$ is a methyl, ethyl or phenyl group.

7. The foamable mixture of claim 4, wherein $R^1$ is a methyl, ethyl or phenyl group.

8. The foamable mixture of claim 1, wherein $R^2$ is a methyl group.

9. The foamable mixture of claim 4, wherein $R^2$ is a methyl group.

10. The foamable mixture of claim 6, wherein $R^2$ is a methyl group.

11. The foamable mixture of claim 1, wherein $R^3$ is a hydrogen atom, an alkyl radical having 1-4 carbon atoms, a cyclohexyl radical or a phenyl radical.

12. The foamable mixture of claim 4, wherein $R^3$ is a hydrogen atom, an alkyl radical having 1-4 carbon atoms, a cyclohexyl radical or a phenyl radical.

13. The foamable mixture of claim 6, wherein $R^3$ is a hydrogen atom, an alkyl radical having 1-4 carbon atoms, a cyclohexyl radical or a phenyl radical.

14. The foamable mixture of claim 8, wherein $R^3$ is a hydrogen atom, an alkyl radical having 1-4 carbon atoms, a cyclohexyl radical or a phenyl radical.

15. The foamable mixture of claim 1, which, after foaming, has a tack-free time of not more than 5 minutes at 20° C.

16. The foamable mixture of claim 1 which is free of tin catalysts.

17. The foamable mixture of claim 1, which is free of catalysts containing heavy metals.

18. The foamable mixture of claim 1, comprising a prepolymer prepared by addition of a silane of the formula [3]

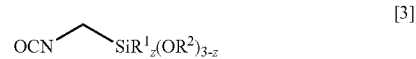
[3]

onto an alcohol having at least two OH functions per molecule and which comprises branched or unbranched hydrocarbon chains which may be substituted by halogen atoms, $C_1$-$C_6$-alkyl, -alkoxy or -acyloxy radicals, optionally interrupted by groups selected from the group consisting of ether groups, carbonyl groups, ester groups, aromatic groups, cycloaliphatic groups, and mixtures thereof, wherein the alcohol contains no urethane or urea groups.

19. A pressurized container containing the foamable mixture of claim 1.

20. The foamable mixture of claim 1, wherein a prepolymer (A) has silane end groups selected from the group consisting of:

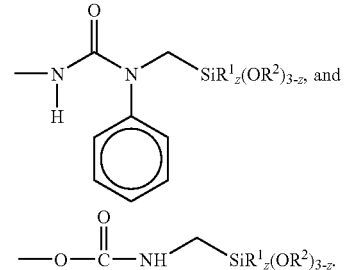

21. An isocyanate-free moisture-curable foamable mixture comprising
  (A) one or more isocyanate-free, alkoxysilane-terminated prepolymers (A) which bear at least one silane end group of the formula [1],

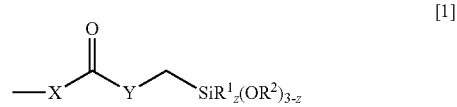
[1]

where
  X is O and Y is NH or where X is NH and Y is $NR^3$,
  $R^1$ is an alkyl, alkenyl or aryl radical having 1-10 carbon atoms,
  $R^2$ is an alkyl radical having 1-2 carbon atoms or an -oxyalkyl alkyl radical having a total of 2-10 carbon atoms,
  $R^3$ is an alkyl, cycloalkyl, alkenyl or aryl radical having 1-10 carbon atoms and
  z is 0 or 1, and
  (B) at least one blowing agent.

22. The foamable mixture of claim 1, wherein the blowing agent comprises dimethyl ether.

23. The foamable mixture of claim 1, wherein X is O and Y is NH.

24. The foamable mixture of claim 1, wherein X is NH and Y is $NR^3$.

* * * * *